(12) United States Patent
Lazar et al.

(10) Patent No.: US 9,892,518 B2
(45) Date of Patent: Feb. 13, 2018

(54) SYSTEMS AND METHODS FOR DETECTING MOTION USING LOCAL PHASE INFORMATION

(71) Applicant: THE TRUSTEES OF COLUMBIA UNIVERSITY IN THE CITY OF NEW YORK, New York, NY (US)

(72) Inventors: Aurel Lazar, New York, NY (US); Nikul H. Ukani, Maharashtra (IN); Yiyin Zhou, Shanghai (CN)

(73) Assignee: The Trustees of Columbia University in the City of New York, New York, NY (US)

(*) Notice: Subject to any disclaimer, the term of this patent is extended or adjusted under 35 U.S.C. 154(b) by 29 days.

(21) Appl. No.: 15/177,924

(22) Filed: Jun. 9, 2016

(65) Prior Publication Data

US 2017/0213350 A1    Jul. 27, 2017

Related U.S. Application Data

(60) Provisional application No. 62/173,148, filed on Jun. 9, 2015, provisional application No. 62/180,419, filed on Jun. 16, 2015.

(51) Int. Cl.
*G06K 9/00* (2006.01)
*G06T 7/20* (2017.01)
(Continued)

(52) U.S. Cl.
CPC ............... *G06T 7/20* (2013.01); *G06T 5/20* (2013.01); *G06T 7/11* (2017.01); *G06K 9/00* (2013.01);
(Continued)

(58) Field of Classification Search
CPC ............... G05D 23/1906; G05D 23/27; G06T 2207/10016; G06T 7/2006; G06T 7/269;
(Continued)

(56) References Cited

U.S. PATENT DOCUMENTS 7,215,831 B2 * 5/2007 Altunbasak ............... G06T 3/40
375/240
7,831,065 B2 * 11/2010 Zimmermann ...... H04N 19/527
375/362

(Continued)

OTHER PUBLICATIONS

Egelhaaf et al., "Computational structure of a biological motion-detection system as revealed by local detector analysis in the fly's nervous system," J. Opt. Soc. Am. A. 6(7):1070-1087 (1989).

(Continued)

*Primary Examiner* — Aklilu Woldemariam
(74) *Attorney, Agent, or Firm* — Baker Botts, LLP

(57) ABSTRACT

Systems and methods for the detection of motion in a multi-dimensional signal are provided. According to aspects of the disclosure, data representing a time sequence of frames of a video stream is received. A multi-dimensional Gaussian window in is then constructed. Each frame of the received data is divided into a plurality of blocks and, for each block in the plurality of blocks, each pixel in the block is multiplied with a corresponding pixel of the Gaussian window to obtain a windowed video block. The FFT of the windowed video block is computed to obtain an amplitude and phase thereof. The occurrence of motion in the block is then determined based on the computed phase of the windowed video block.

11 Claims, 14 Drawing Sheets

(51) Int. Cl.
*G06T 7/11* (2017.01)
*G06T 5/20* (2006.01)

(52) U.S. Cl.
CPC ............... *G06T 2207/10016* (2013.01); *G06T 2207/20056* (2013.01)

(58) Field of Classification Search
CPC ... G06T 7/13; G06T 2207/20068; G06T 7/11; G06T 2207/20056; G06T 5/20; G06T 7/20; G06T 7/262; G06T 3/4069; G06T 3/4084; G06T 5/002; G06T 5/10; G06T 3/40; G06T 11/005; G06T 2207/10081; H04N 19/172; H04N 19/577; H04N 19/142; H04N 19/523; H04N 19/527; H04N 19/547; H04N 7/0135; H04N 5/213; H04N 19/117; H04N 19/154; H04N 19/192; H04N 19/48; H04N 19/59; H04N 19/61; H04N 19/85; H04N 19/86; H04N 19/90; H04N 5/335; G06K 9/627; G06K 9/00; G06K 9/00624; G06K 9/0063; G06K 9/3233; G06K 9/4628; G06K 9/4671; G06K 9/6293; H04R 3/005; G11B 27/28; A61B 6/032; A61B 6/4035; A61B 6/4085; A61B 6/4241; A61B 6/4291; A61B 6/482; A61B 6/484; A61B 6/502; A61B 6/5235; G01N 23/087; G01N 23/20091
USPC ................ 382/103, 122, 128, 254, 276, 294
See application file for complete search history.

(56) References Cited

U.S. PATENT DOCUMENTS

| | | | | |
|---|---|---|---|---|
| 8,629,913 B2* | 1/2014 | Cote | ...................... | H04N 5/335 348/222.1 |
| 8,630,454 B1* | 1/2014 | Wang | ................... | G06T 7/2006 382/103 |
| 2006/0157640 A1* | 7/2006 | Perlman | ............... | H04N 5/2254 250/208.1 |
| 2008/0174699 A1* | 7/2008 | Suzuki | ...................... | G06T 5/10 348/607 |
| 2009/0079871 A1* | 3/2009 | Hua | ...................... | G11B 27/036 348/584 |
| 2010/0020241 A1* | 1/2010 | Takeshima | ............ | G06T 3/4069 348/607 |
| 2010/0150225 A1* | 6/2010 | Wredenhagen | ...... | H04N 19/176 375/240.02 |
| 2010/0246680 A1* | 9/2010 | Tian | ................. | H04N 19/00569 375/240.16 |
| 2011/0109803 A1* | 5/2011 | Sharlet | ................... | H04N 5/145 348/607 |
| 2012/0098986 A1* | 4/2012 | Robertson | ............ | H04N 19/523 348/222.1 |
| 2012/0127370 A1* | 5/2012 | Singh | ..................... | H04N 5/213 348/607 |
| 2013/0028472 A1* | 1/2013 | Pham | .................... | G06T 7/0026 382/103 |
| 2013/0142396 A1* | 6/2013 | Fletcher | .................... | G06T 7/32 382/106 |
| 2013/0272548 A1* | 10/2013 | Visser | ................ | G06K 9/00624 381/122 |
| 2014/0086452 A1* | 3/2014 | Ukil | ......................... | G06T 7/20 382/103 |

OTHER PUBLICATIONS

Sun et al., "Secrets of Optical Flow Estimation and Their Principles," IEEE Conference on Computer Vision and Pattern Recognition (CVPR), pp. 2432-2439 (2010).

Tam, "Hexagonal pixel-array for efficient spatial computation for motion-detection pre-processing of visual scenes," Advances in Image and Video Processing 2(2):26-36 (2014).

* cited by examiner

Input: Visual stream or Video data $u(x, y, t)$
Output: Detected Motion
Construct Gaussian window of size $M \times M$, denote as $w$;
for $t = \Delta T, 2\Delta T, \ldots, N\Delta T$ do
    Divide the screen of frame at time $t$ into multiple $M \times M$ blocks $u_{kl}(t)$, with overlaps;
    foreach block $u_{kl}(t)$ do
        Multiply pixel-wise the block $u_{kl}(t)$ with the Gaussian window $w$: $u_{kl}(t)w$;
        Take $M \times M$ 2D FFT of $u_{kl}(t)w$, denote phase as $\phi_{kl}(\omega_x, \omega_y, t)$ and amplitude as $A_{kl}(\omega_x, \omega_y, t)$;
        foreach frequency $(\omega_x, \omega_y)$ do
            Highpass filter, temporally, $\phi_{kl}(\omega_x, \omega_y, t)$, denote $\phi'_{kl}(\omega_x, \omega_y, t)$;
            Optionally, denoise by $\phi'_{kl}(\omega_x, \omega_y, t) \leftarrow \phi'_{kl}(\omega_x, \omega_y, t)(A_{kl}(\omega_x, \omega_y, t)/((1/M^2)\sum_{(\omega_x, \omega_y) \in \mathbb{R}^2} A_{kl}(\omega_x, \omega_y, t) + \epsilon));$
        end
        Compute the radon transform $(\mathcal{R}\phi'_{kl})(\rho, \theta, t)$;
        Compute $PML_{kl}(t)$ according to (38);
        if $PML_{kl}(t) > threshold$ then
            Motion Detected at block $(k, l)$ at time $t$;
            Compute direction of motion according to (39);
    end
end

FIG. 5

SYSTEMS AND METHODS FOR DETECTING MOTION USING LOCAL PHASE INFORMATION

CROSS REFERENCE TO RELATED APPLICATION

This application is related to, and claims priority from, Provisional Patent Application No. 62/173,148, entitled "Systems and Methods for Phase-Based Visual Motion Detection and Segmentation," which was filed on Jun. 9, 2015, and Provisional Patent Application No. 62/180,419, entitled "Systems and Methods for Motion Detection Using Phase Information," which was filed Jun. 16, 2015, the entire contents of both of which are incorporated by reference herein.

STATEMENT REGARDING FEDERALLY SPONSORED RESEARCH

This invention was made with government support under FA9550-12-1-0232 awarded by the Air Force Office of Scientific Research. The government has certain rights in the invention.

BACKGROUND

The design of an information processing system can be approached on multiple levels. FIG. 1 illustrates two levels of abstraction, namely, the algorithm level and the physical circuit level. On the algorithmic level, one studies procedurally how the information is processed independently of the physical realization. The circuit level concerns the actual realization of the algorithm in physical hardware, for example, a biological neural circuit or silicon circuits in a digital signal processor.

Visual motion detection is important to the survival of animals. Many biological visual systems have evolved efficient/effective neural circuits to detect visual motion. Motion detection is performed in parallel with other visual coding circuits and starts already in the early stages of visual processing. In the retina of vertebrates, at least three types of Direction-Selective Ganglion Cells (DSGC) are responsible for signaling visual motion at this early stage. In flies, direction-selective neurons are found in the optic lobe, 3 synapses away from the photoreceptors.

The small number of synapses between photoreceptors and direction-selective neurons suggests that the processing involved in motion detection is not highly complex but still very effective. In addition, the biological motion detection circuits can be organized in a highly parallel way to enable fast, concurrent computation of motion. It is also interesting to note that the early stages of motion detection are carried out largely in the absence of spiking neurons, indicating that initial stages of motion detection are preferably performed in the "analog" domain. Taking advantage of continuous time processing can be important for quickly processing motion since motion intrinsically elicits fast and large changes in the intensity levels, that is, large amounts of data under stringent time constraints.

Certain computer-based motion detection algorithms employ optic flow techniques to estimate spatial changes in consecutive image frames. Although, often time, optic flow estimation algorithms produce accurate results, the computational demand to perform many of these algorithms can be too high for real-time implementation.

Several models for biological motion detection are known. For example, the Reichardt motion detector for motion detection in insects uses a correlation method to extract motion induced by spatiotemporal information patterns of light intensity. Therefore, it uses a correlation/multiplication operation. The motion energy detector uses spatiotemporal separable filters and a squaring nonlinearity to compute motion energy and it was shown to be equivalent to the Reichardt motion detector. Work in the rabbit retina was used for the Barlow-Levick model of motion detection, which uses inhibition to compensate motion in the null direction. However, there exists a need for an improved motion detection technique.

SUMMARY

According to aspects of the present disclosure, methods for motion detection are provided. An example method includes receiving data representing a time sequence of frames of a multi-dimensional signal and constructing a multi-dimensional Gaussian window. The method can further include dividing each frame of the received data into a plurality of blocks. The method can further include, for each block in the plurality of blocks, multiplying each pixel in the block with a corresponding pixel of the Gaussian window to obtain a windowed signal block, and computing the multi-dimensional FFT of the windowed signal block to obtain an amplitude and phase thereof. The method can further include detecting the occurrence of motion in the block based on the computed phase of the windowed signal block.

According to other aspects of the present disclosure, a system including a processor and memory is provided, in which the processor is programmed to carry out the above method. Further, a computer readable medium is provided, where the computer readable stores instructions that, when executed by a processor, cause the processor to carry out the above method.

BRIEF DESCRIPTION OF THE DRAWINGS

FIG. 5 depicts an embodiment of a phase-based motion detection algorithm.

DETAILED DESCRIPTION

Figure 1:
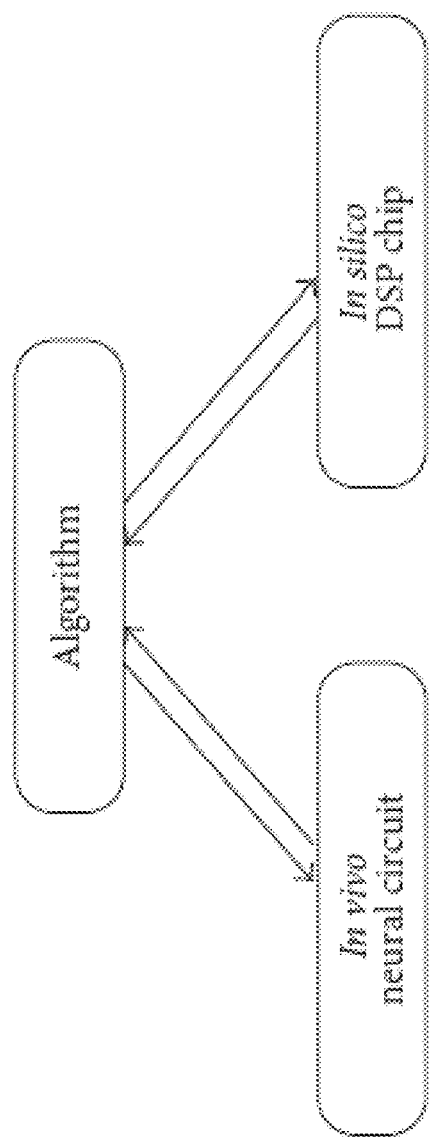
FIG. 1 is a block diagram illustrating the implementation of algorithms in vivo as neural circuits or in silico.

Images can be represented by their global phase alone. Provided herein are techniques for reconstructing visual scenes by only using local phase information, thereby demonstrating the spectrum of the representational capability of phase information.

The Fourier shift property suggests the relationship between the global shift of an image and the global phase shift in the frequency domain. This relationship is elevated by computing the change of local phase to indicate motion that appears locally in the visual scene. The local phases can be computed using window functions that tile the visual field with overlapping segments, making it amenable for a highly parallel implementation. In addition, a Radon transform-based motion detection index on the change of local phases is provided for the readout of the relation between local phases and motion.

Phase information has been largely ignored in the field of linear signal processing. Phase-based processing is intrinsically non-linear. However, phase information can be employed in speech processing and visual processing. For example, spatial phase in an image is indicative of local features such as edges when considering phase congruency.

As demonstrated herein, local phase information can be used to represent visual information in the absence of amplitude information. Accordingly, one or more embodiments of a local phase based algorithm to detect motion in visual scenes are provided. Examples and applications of the motion detection algorithm disclosed in relation to motion segmentation.

Complex valued transforms can be used for both representing and processing images. When represented in polar coordinates, the output of a complex valued transform of a signal can be split into amplitude and phase. In this embodiment, two types of phases of an image are defined: a global phase and a local phase. Both types of phases can faithfully represent an image. Accordingly, an example of a reconstruction algorithm that recovers the image from local phase information is provided. This indicates that phase information alone can largely represent an image or video signal. As disclosed herein, the use of phase for representing image and video information leads to efficient ways to implement certain types of image/video processing algorithms, for example, motion detection algorithms.

Global Phase of Images.

The Fourier transform of a real valued image $u=u(x,y)$, $(x,y) \in \mathbb{R}^2$, is given by $$\hat{U}(w_x, w_y) = \int_{\mathbb{R}^2} u(x,y) e^{-j(w_x x + w_y y)} dx dy \quad (1)$$

with $\hat{U}(w_x, w_y) \in \mathbb{C}$ and $(w_x, w_y) \in \mathbb{R}^2$.

In polar coordinates, the Fourier transform of u can be expressed as $$\hat{U}(w_x, w_y) = \hat{A}(w_x, w_y) e^{j\varphi(w_x, w_y)}, \quad (2)$$

where $A(w_x, w_y) \in \mathbb{R}$ is the amplitude and $\varphi(w_x, w_y)$ is the phase of the Fourier transform of u.

The amplitude of the Fourier transform of an image $u=u(x,y)$, $(x,y) \in \mathbb{R}^2$, is called the global amplitude of u. The phase of the Fourier transform of an image $u=u(x,y)$, $(x,y) \in \mathbb{R}^2$, is called the global phase of u.

The global phase of an image plays a role in the representation of natural images. One example is to take two images and to exchange their global phases before their reconstruction using the inverse Fourier transform. The resulting images can be smeared but largely reflect the information contained in the global phase.

Local Phase of Images

The global phase indicates the offset of sinusoids of different frequencies contained in the entire image. However, it is not intuitive to relate the global phase to local image features such as edges and their position in an image. To understand these local features, the Fourier transform can be modified such that it reflects properties of a restricted region of an image. The Short-Time (-Space) Fourier Transform (STFT) can be considered:

$$U(w_x, w_y, x_0, y_0) = \int_{\mathbb{R}^2} u(x,y) w(x-x_0, y-y_0) \cdot e^{-j(w_x(x-x_0) + w_y(y-y_0))} dx dy, \quad (3)$$

where $w=w(x,y)$, $(x,y) \in \mathbb{R}^2$, is a real valued window function centered at $(x_0, y_0) \in \mathbb{R}^2$. Certain choices of window functions include the Hann window and the Gaussian window. The (effectively) finite support of the window restricts the Fourier transform to local image analysis.

Similar to the Fourier transform, the STFT can be expressed in polar coordinates as $$U(w_x, w_y, x_0, y_0) = A(w_x, w_y, x_0, y_0) e^{j\varphi(w_x, w_y, x_0, y_0)}, \quad (4)$$

where $A(w_x, w_y, x_0, y_0) \in \mathbb{R}$ is the amplitude and $\varphi(w_x, w_y, x_0, y_0)$ is the phase of the STFT.

The amplitude of the STFT of an image $u=u(x,y)$, $(x,y) \in \mathbb{R}^2$, is called the local amplitude of u. The phase of the STFT of an image $u=u(x,y)$, $(x,y) \in \mathbb{R}^2$, is called the local phase of u.

It should be noted that when w is a Gaussian window, the STFT of u evaluated at $(w_x, w_y, x_0, y_0)$ can be equivalently viewed as the response of a complex-valued Gabor receptive field $$h(x,y) = e^{-((x-x_0)^2 + (y-y_0)^2)/2\sigma^2} e^{-j(w_x(x-x_0) + w_y(y-y_0))} \quad (5)$$

to u.

In this case, the window of the STFT is given by $$w(x,y) = e^{-(x^2+y^2)/2\sigma^2}. \quad (6)$$

Therefore, the STFT can be realized by an ensemble of Gabor receptive fields that are common in modeling simple and complex cells (neurons) in the primary visual cortex.

Reconstruction of Images from Local Phase

Amplitude and phase can be interpreted as measurements/projections of images that are indicative of their information content. When both the global amplitude and phase are known, the image can be reconstructed. The reconstruction calls for computing the inverse Fourier transform given the global amplitude and phase. Similarly, when using local amplitude and phase, if the sampling functions form a basis or frame in a space of images, the reconstruction is provided by the formalism of wavelet theory, for example, using Gabor wavelets.

Amplitude or phase represents partial information extracted from visual scenes. They can be obtained via nonlinear sampling, that is, a nonlinear operation for extracting the amplitude and phase information from images. The nonlinear operation can make reconstruction from either amplitude or phase alone difficult. However, certain images can be reconstructed from global or local amplitude information.

While computing the amplitude can require a second order (quadratic) nonlinearity, computing the phase calls for higher order nonlinear operators (Volterra kernels). However, one can reconstruct up to a constant scale an image from its global phase information alone without explicitly using the amplitude information.

Similarly, up to a constant scale, a bandlimited signal $u=u(x,y)$, $(x,y) \in \mathbb{R}^2$, can be reconstructed from its local phase alone. First the encoding of an image u is formulated by local phase, using the Gabor receptive fields as a special case. The problem can then be formulated with local phase computed from other types of STFTs.

Formally, an image, $u=u(x,y)$, on the domain $\mathbb{R}^2$, is an element of a space of trigonometric polynomials $\mathcal{H}$ of the form $$u(x,y) = \sum_{l_x=-L_x}^{L_x} \sum_{l_y=-L_y}^{L_y} c_{l_x l_y} e_{l_x l_y}(x,y), \qquad (7)$$

where $$e_{l_x l_y} = \exp\left(j l_x \frac{\Omega_x}{L_x} x\right) \exp\left(j l_y \frac{\Omega_y}{L_y} y\right), \qquad (8)$$

$$l_x = -L_x, \ldots, L_x, \ l_y = -L_y, \ldots, L_y$$

are the set of basis functions of $\mathcal{H}$, $\Omega_x$ and $L_x$ are the bandwidth and the order, respectively, of the space in the x dimension, and $\Omega_y$ and $L_y$ are the bandwidth and the order, respectively, of the space in the y dimension.

$\mathcal{H}$ is a Reproducing Kernel Hilbert Space with inner product $$\langle u_1, u_2 \rangle = \int_{[0,T_x] \times [0,T_y]} u_1(x,y) \overline{u_2(x,y)} dxdy, \qquad (9)$$

where $T_x=2\pi L_x/\Omega_x$, $T_y=2\pi L_y/\Omega_y$ are the period of the space in the x and y dimensions, respectively.

A bank of N Gabor receptive fields can be represented as $$h_{kl,mn}(x,y) = \mathcal{T}_{kl}\left(w(x,y) e^{-j(\omega_{x_m} x + \omega_{y_n} y)}\right), \qquad (10)$$

where $T_{kl}$ is the translation operator with $T_{kl} u = u(x-kb_0, y-lb_0)$, $k, l \in \mathbb{Z}$, $b_0>0$, $0 \le kb_0 \le T_x$, and $0 \le lb_0 \le T_y$, and $w_{x_m} = mw_0$, $w_{y_n} = nw_0$, $m, n \in \mathbb{Z}$, $w_0>0$, $-\Omega_x \le mw_0 \le \Omega_x$, and $-\Omega_y \le nw_0 \le \Omega_y$. The responses of the Gabor receptive fields to the input $u(x,y)$ are given by $$\int_{\mathbb{R}^2} u(x,y) h_{kl,mn}(x,y) dxdy = \int_{\mathbb{R}^2} u(x,y) \cdot w(x-kb_0, y-lb_0) \qquad (11)$$
$$e^{-j(\omega_{x_m}(x-kb_0)+\omega_{y_n}(y-lb_0))} dxdy = A_{kl,mn} e^{j\phi_{kl,mn}},$$

where $A_{kl,mn} \ge 0$, $A_{kl,mn} \in \mathbb{R}$, is the local amplitude and $\varphi_{kl,mn} \in [0, 2\pi)$ is the local phase.

Dividing both sides of (11) by $e^{j\varphi_{kl,mn}}$ results in $$\int_{\mathbb{R}^2} u(x,y) w(x-kb_0, y-lb_0) \cdot e^{-j(\omega_{x_m}(x-kb_0)+\omega_{y_n}(y-lb_0)+\phi_{kl,mn})} dxdy = \qquad (12)$$
$$A_{kl,mn}.$$

Since $A_{kl,mn} \in \mathbb{R}$, we have $$\int_{\mathbb{R}^2} u(x,y) w(x-kb_0, y-lb_0) \cdot \cos(w_{x_m}(x-kb_0)+w_{y_n}(y-lb_0)+\varphi_{kl,mn}) dxdy = A_{kl,mn}, \qquad (13)$$

$$\int_{\mathbb{R}^2} u(x,y) w(x-kb_0, y-lb_0) \cdot \sin(w_{x_m}(x-kb_0)+w_{y_n}(y-lb_0)+\varphi_{kl,mn}) dxdy = 0. \qquad (14)$$

It should be noted that $w(x-kb_0, y-lb_0) \sin(w_{x_m}(x-kb_0)+w_{y_n}(y-lb_0)+\varphi_{kl,mn})$ is a real-valued Gabor receptive field with a preferred phase at $\varphi_{kl,mn}+\pi/2-w_{x_m} kb_0-w_{y_n} lb_0$.

Assuming that the local phase information $\varphi_{kl,mn}$ is obtained via measurements, that is, filtering the image u with pairs of Gabor receptive fields (10), the set of linear equations (14) can be interpreted as follows: the image u is orthogonal to the space spanned by the functions $$w(x-kb_0, y-lb_0) \cdot \sin(w_{x_m}(x-kb_0)+w_{y_n}(y-lb_0)+\varphi_{kl,mn}), \qquad (15)$$

where $(k,l,m,n) \in \mathbb{T}$ with $\mathbb{T} = \{(k,l,m,n) \in \mathbb{Z}^4 | 0 \le kb_0 \le T_x, 0 \le lb_0 \le T_y, -\Omega_x \le mw_0 \le \Omega_x, -\Omega_y \le nw_0 \le \Omega_y\}$.

An embodiments of a reconstruction algorithm of the image from phase $\varphi_{kl,mn}$, $(k,l,m,n) \in \mathbb{T}$ is provided herein. First, it should be noted that u can be reconstructed from $\varphi_{kl,nm}$, $(k,l,m,n) \in \mathbb{T}$ as $$u(x,y) = \sum_{l_x=-L_x}^{L_x} \sum_{l_y=-L_y}^{L_y} c_{l_x l_y} e_{l_x l_y}(x,y), \qquad (16)$$

with $$\Phi c = 0, \qquad (17)$$

where $\Phi$ is a matrix whose pth row and qth column entry are $$[\Phi]_{pq} = \int_{\mathbb{R}^2} w(x-kb_0, y-lb_0) \cdot \sin(w_{x_m}(x-kb_0)+w_{y_n}(y-lb_0)+\varphi_{kl,mn}) \cdot e_{l_x l_y}(x,y) dxdy. \qquad (18)$$

Here p traverses the set $\mathbb{T}$, and $q=(2L_y+1)(l_x+L_x)+(l_y+L_y+1)$. c is a vector of the form $$c = [c_{-L_x,-L_y}, c_{-L_x,-L_y+1}, \ldots, c_{-L_x,L_y}, c_{-L_x+1,-L_y}, c_{-L_x+1,-L_y+1}, \ldots, c_{-L_x+1,L_y}, \ldots, c_{L_x,-L_y}, c_{L_x,-L_y+1}, \ldots, c_{L_x,L_y}]^T \qquad (19)$$

that belongs to the null space of $\Phi$. A necessary condition for perfect reconstruction of u, up to a constant scale, is that $N \ge (2L_x+1)(2L_y+1)-1$, where N is the number of phase measurements.

Figure 2:
FIG. 2 depicts an example of the reconstruction of an image using only local phase information, in accordance with one or more embodiments.

In FIG. 2, an example of reconstruction of an image is shown using only local phase information. The reconstructed signal is scaled to match the original signal. The SNR of the reconstruction is 44.48 dB. An alternative way to obtain a unique reconstruction is to include an additional measurement, for example, the mean value of the signal $\int_{\mathbb{R}^2} u(x,y) dxdy$ to the system of linear equations (14).

The Global Phase Equation for Translational Motion

Let $u=u(x,y,t)$, $(x,y) \in \mathbb{R}^2$, $t \in \mathbb{R}$, be a visual stimulus. If the visual stimulus is a pure translation of the signal at $u(x,y,0)$, that is, $$u(x,y,t) = u(x-s_x(t), y-s_y(t), 0), \qquad (22)$$

where $$s_x(t) = \int_0^t v_x(s) ds,$$

$$s_y(t) = \int_0^t v_y(s) ds \qquad (23)$$

are the total length of translation at time t in each dimension and $v_x(t)$ and $v_y(t)$ are the corresponding instantaneous velocity components, then the only difference between $u(x,y,t)$ and $u(x,y,0)$ in the Fourier domain is captured by their global phase.

Further, the change (derivative) of the global phase is given by $$\frac{d\hat{\phi}(\omega_x, \omega_y, t)}{dt} = -\omega_x v_x(t) - \omega_y v_y(t) \qquad (24)$$
$$= -[\omega_x, \omega_y][v_x(t), v_y(t)]^T,$$

where $\hat{\phi}(w_x, w_y, t)$ denotes the global phase of $u(x,y,t)\hat{\phi}(w_x, w_y, 0)$ is the initial condition.

The Local Phase Equation for Translational Motion

The previous analysis applies to global motion. This type of motion occurs, e.g., when the imaging device, either an eye or a camera, moves. Visual motion in the natural environment, however, can be more diverse across the screen since it is, often time, produced by multiple moving objects. The objects can be small and the motion more localized in the visual field.

Taking the global phase of u does not easily reveal where motion of independent objects takes place or their direction/velocity of motion. The interpretation of motion by using the Fourier transform, however, can be applied for detecting local motion. This can be achieved by restricting the domain of the visual field where the Fourier transform is applied.

To be able to detect local motion, the local phase of $u(x,y,t)$ is obtained by taking the STFT with window function $w(x,y)$. It should be noted that the STFT and its ubiquitous implementation in DSP chips can be used in any dimension. For simplicity and without loss of generality, the window can be centered at (0,0). The STFT is given by $$\int_{\mathbb{R}^2} u(x,y,t)w(x,y)e^{-j(w_xx+w_yy)}dxdy = A_{00}(w_x, w_y, t)e^{j\phi_{00}(w_x,w_y,t)}, \qquad (27)$$

where $A_{00}(w_x, w_y, t)$ is the amplitude and $\phi_{00}(w_x, w_y, t)$ the local phase.

The relation between the change in local phase and visual motion taking place across the window support can be explained as follows. First, if the stimulus can undergo a uniform change of intensity or it changes proportionally over time due to lighting conditions, for example, the local phase does not change since the phase is invariant with respect to intensity scaling. Therefore, the local phase does not change for such non-motion stimuli. Second, a rigid edge moving across the window support will induce a phase change.

For a strictly translational signal within the window support (footprint), for example, $$u(x,y,t) = u(x - s_x(t), y - s_y(t), 0), \qquad (28)$$

for $(x,y) \in \text{supp}(w(x,y))$,
where $s_x(t)$ and $s_y(t)$ are as defined in (23).
Further:

$$\frac{d\phi_{00}}{dt}(\omega_x, \omega_y, t) = \frac{ds_x(t)}{dt}\omega_x - \frac{ds_y(t)}{dt}\omega_y + b_{00}(\omega_x, \omega_y, t), \qquad (29)$$

where, by abuse of notation, $\phi_{00}(w_x, w_y, t)$ is the local phase of $u(x,y,t)$ and $\phi_{00}(w_x, w_y, 0)$ is the initial condition.

Figure 3:
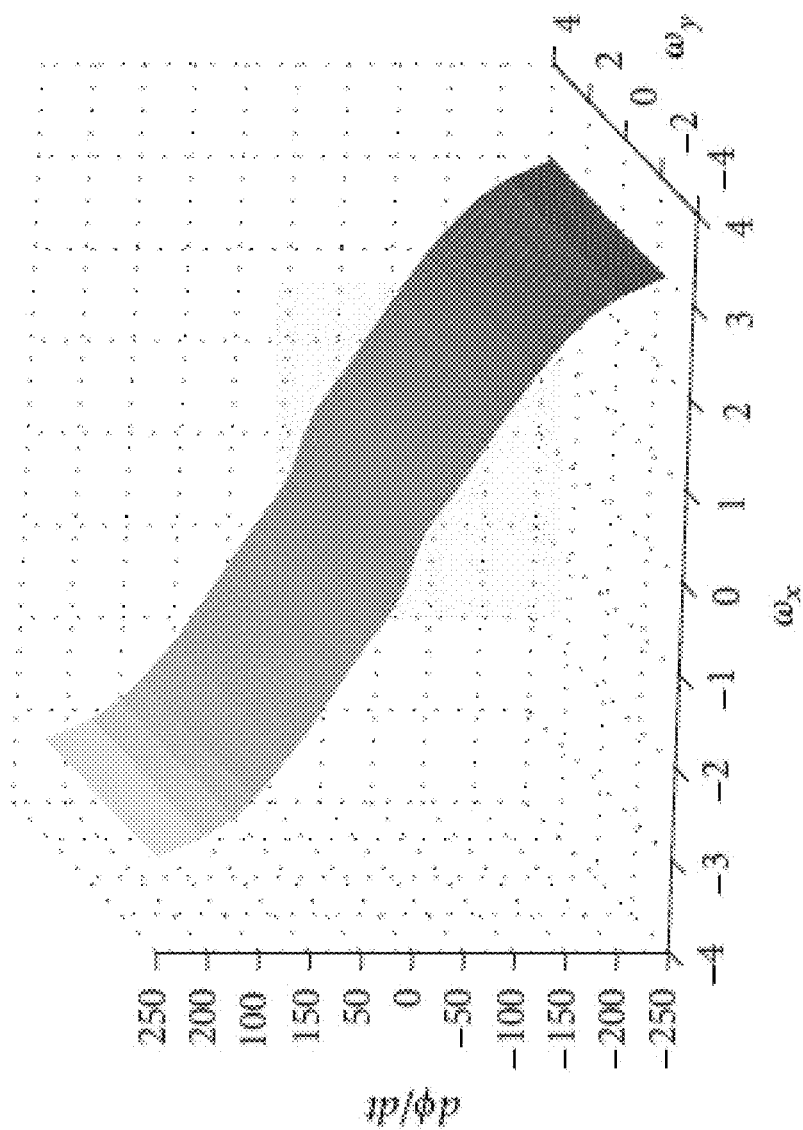
FIG. 3 is a graph that shows the derivative of the local phase, according to one embodiment.

It should be noted that the derivative of the local phase has similar structure to that of the global phase, but for the added term $\int_{\mathbb{R}^2} b_{00}$. The first two terms in (29) can dominate over the last term for an ON or OFF moving edge. For example, FIG. 3 shows the derivative of the local phase given in (29) for an ON edge moving with velocity (40, 0) pixels/sec.

It should be noted that $\phi_{00}(w_x, w_y, t)$ is not necessarily differentiable even if $u(x,y,t)$ is differentiable, particularly when $A_{00}(w_x, w_y, t) = 0$. For example, the spatial phase can jump from a positive value to zero when $A_{00}(w_x, w_y, t)$ diminishes. This also suggests that the instantaneous local spatial phase is less informative about a region of a visual scene whenever $A_{00}(w_x, w_y, t)$ is close to zero. Nevertheless, the time derivative of the local phase can be approximated by applying a high-pass filter to $\phi_{00}(w_x, w_y, t)$.

The Block Structure for Computing the Local Phase

First, Gaussian windows along the x, y dimensions are constructed. The Gaussian windows are defined as $$(\mathcal{F}_{kl}w)(x,y) = e^{-((x-x_k)^2 + (x-y_l)^2)/2\sigma^2}, \qquad (30)$$

where $x_k = kb_0$, $y_l = lb_0$, in which $b_0 \in \mathbb{Z}^+$ is the distance between two neighboring windows and $1 \leq kb_0 \leq P_x$, $1 \leq lb_0 \leq P_y$, where $P_x, P_y \in \mathbb{Z}^+$ are the number of pixels of the screen in the x and y directions, respectively.

The 2D Fourier transform of the windowed video signal $u(x,y,t)(\mathcal{F}_{kl}w)(x,y)$ is taken and written in polar form $$\int_{\mathbb{R}^2} u(x,y,t)(\mathcal{F}_{kl}w)(x,y)e^{-j(w_x(x-x_k)+w_y(y-y_l))}dxdy = A_{kl}(w_x, w_y, t)e^{j\phi_{kl}(w_x,w_y,t)}. \qquad (31)$$

The above integral can be evaluated using the 2D FFT in a discrete domain defined on M×M blocks approximating the footprint of the Gaussian windows. For example, the standard deviation of the Gaussian windows disclosed in the examples herein is 4 pixels. A block of 32×32 pixels (M=32) is sufficient to cover the effective support (or footprint) of the Gaussian window. At the same time, the size of the block is a power of 2, which can be suitable for FFT-based computation. The processing of each block (k,l) is independent of all other blocks; thus, parallelism is achieved.

It should be noted that the size of the window is informed by the size of the objects to be located. Measurements of the local phase using smaller window functions are less robust to noise. Larger windows can enhance object motion detection if the object size is comparable to the window size. However, there can be an increased likelihood of independent movement of multiple objects within the same window, which is not necessarily robustly detected.

Therefore, for each block (k,l), $M^2$ measurements of the phase $\phi_{kl}(w_{xm}, w_{ym}, t)$ are obtained at every time instant t, with $(w_{xm}, w_{ym}) \in \mathbb{D}^2$, where $$\mathbb{D}^2 = \{(w_{x_m} = mw_0, w_{y_n} = nw_0), m,n = -M/2, -M/2+1, \ldots, M/2-1\}, \qquad (32)$$

with $w_0 = 2\pi/M$. The temporal derivative of the phase is then computed, that is, $(d\phi_{kl}/dt)(w_x, w_y, t)$ for $(w_x, w_y) \in \mathbb{D}^2$.

Figure 4:
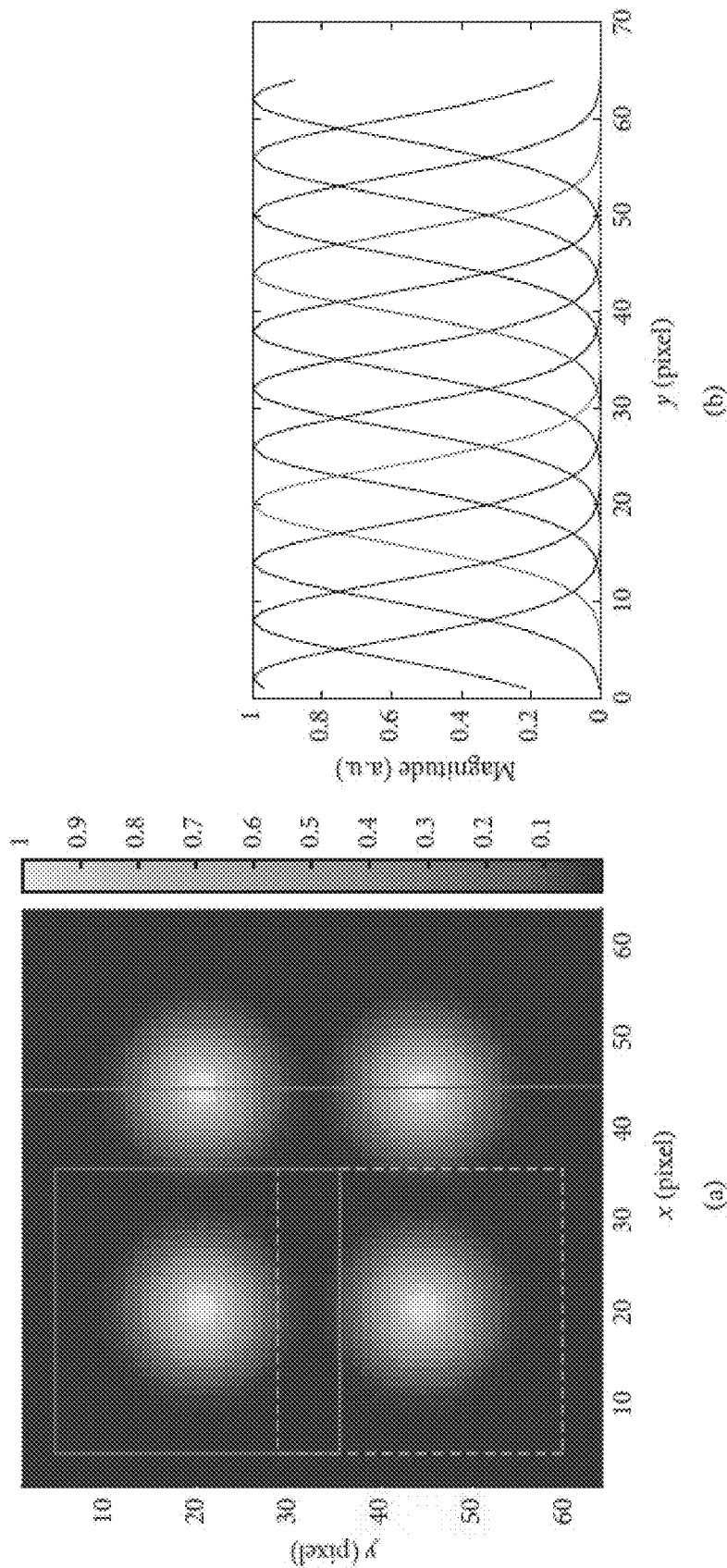
FIG. 4 is a block diagram depicting the block structure used to compute local phase, according to one or more embodiments.

An example of the block structure is illustrated in FIG. 4. FIG. 4(a) shows an example of an image of 64×64 pixels. Four Gaussian windows are shown each with a standard deviation of 4 pixels. The distance between the centers of two neighboring Gaussian windows is 6 pixels. The solid square shows a 32×32-pixel block with k=3, l=3, which encloses effective support of the Gaussian window on top-left (k=0, l=0 is the block with Gaussian window centered at pixel (1,1)). The dashed square shows another 32×32-pixel block with k=3, l=7. The two Gaussian windows on the right are associated with the blocks k=7, l=3 and k=7, l=7, respectively. Cross section of all Gaussian windows with k=7, l∈[0,10], are shown in FIG. 4(b).

The curves in FIG. 4(b) correspond to the two Gaussian windows shown in FIG. 4(a). FIG. 4(b) also suggests that some of the Gaussian windows are cut off on the boundaries. This is, however, equivalent to assuming that the pixel values outside the boundary are always zero, and should not affect motion detection based on the change of local phase.

Since the phase, and thereby the phase change, is noisier when the local amplitude is low, de-noising can be employed to discount the measurements of $(d\varphi_k/dt)(w_x,w_y,t)$ for low amplitude values $A_{kl}(w_x,w_y,t)$. The de-noising is given by $$\frac{d\phi_{kl}}{dt}(\omega_x, \omega_y, t) \cdot \frac{A_{kl}(\omega_x, \omega_y, t)}{(1/M^2)\sum_{(\omega_x,\omega_y)\in D^2} A_{kl}(\omega_x, \omega_y, t) + \epsilon}, \quad (33)$$

where $\epsilon>0$ is a constant, and $(w_x,w_y)\in \mathbb{D}^2$.

The Phase-Based Detector

An embodiment of a block FFT based algorithm to detect motion using phase information is provided. This can be suitable for an in silico implementation.

Radon Transform on the Change of Phases

The approximately linear structure of the phase derivative for blocks exhibiting motion is exploited by computing the Radon transform of $(d\varphi_{kl}/dt)(w_x,w_y,t)$ over a circular bounded domain $C=\{(w_x,w_y)|(w_x,w_y)\in \mathbb{D}^2, w_x^2+w_y^2<\pi^2\}$.

The Radon transform of the change of phase in the domain C is given by $$\left(\mathcal{R}\frac{d\phi_{kl}}{dt}\right)(\rho, \theta, t) = \int_{\mathbb{R}} \frac{d\phi_{kl}}{dt}(\rho\cdot\cos\theta - s\cdot\theta, \rho\cdot\sin\theta + s\cdot\cos\theta, t) \quad (34)$$
$$1_C(\rho\cdot\cos\theta - s\cdot\sin\theta, \rho\cdot\sin\theta + s\cdot\cos\theta)ds,$$

where $$1_C(\omega_x, \omega_y) = \begin{cases} 1 & \text{if } (\omega_x, \omega_y)C \\ 0 & \text{otherwise} \end{cases} \quad (35)$$

The Radon transform $(\mathcal{R}(d\varphi_{kl}/dt))(\rho,\theta,t)$ evaluated at a particular point $(\rho_0,\theta_0, t_0)$ is essentially an integral of $(d\varphi_{kl}/dt)(w_x,w_y,t_0)$ along a line oriented at angle $\pi/2+\theta_0$ with the $w_x$ axis and at distance $|\rho_0|$ along the $(\cos(\theta_0), \sin(\theta_0))$ direction from $(0,0)$.

If, for a particular k and l, $(d\theta_{kl}/dt)(w_x,w_y,t)=-v_x(t)w_x-v_y(t)w_y$, then $$\frac{(\mathcal{R}(d\phi_{kl}/dt))(\rho, \theta, t)}{c(\rho, \theta)} = \rho[-v_x(t)\cos\theta - v_y(t)\sin\theta], \quad (36)$$

where $$c(\rho, \theta) = \int_{\mathbb{R}} 1_C(\rho\cdot\cos\theta - s\cdot\sin\theta, \rho\cdot\sin\theta + s\cdot\cos\theta)ds. \quad (37)$$

$c(\rho,\theta)$ is a correction term due to the different length of line integrals for different values of $(\rho,\theta)$ in the bounded domain C.

After computing the Radon transform of $(d\varphi_{kl}/dt)(w_x,w_y,t)$ for every block (k,l) at time $t_0$, the Phase Motion Indicator (PMI) is computed. The PMI is defined as $$PMI_{kl} = \max_{\theta\in(0,\pi)} \sum_{\rho} \left|\frac{(\mathcal{R}(d\phi_{kl}/dt))(\rho, \theta, t_0)}{c(\rho, \theta)}\right|. \quad (38)$$

If the $PMI_{kl}$ is larger than a chosen threshold, motion is deemed to occur in block (k,l) at time $t_0$.

Using the Radon transform enables separation of rigid motion from noise. Since the phase is sensitive to noise, particularly when the amplitude is very small, the change of phase under noise can have comparable magnitude to that due to motion. The change of phase under noise, however, does not possess the structure suggested by (29) in the $(w_x,w_y)$ domain. Instead, the change is more randomly distributed. Consequently, the PMI value is comparatively small for these blocks.

Moreover, the direction of motion, for block (k,l) where motion is detected, can be computed as $$\hat{\theta}_{kl} = \pi\left(\frac{\text{sign}\left(\sum_{\rho>0}(\mathcal{R}(d\phi_{kl}/dt))(\rho_{kl}, t_0)/c(\rho, \alpha_{kl})\right)+1}{2}\right) + \alpha_{kl}, \quad (39)$$

where $$\alpha_{kl} = \underset{\theta\in(0,\pi)}{\text{argmax}} \sum_{\rho} \left|\frac{(\mathcal{R}(d\phi_{kl}/dt))(\rho, \theta, t_0)}{c(\rho, \theta)}\right|. \quad (40)$$

Figure 6:
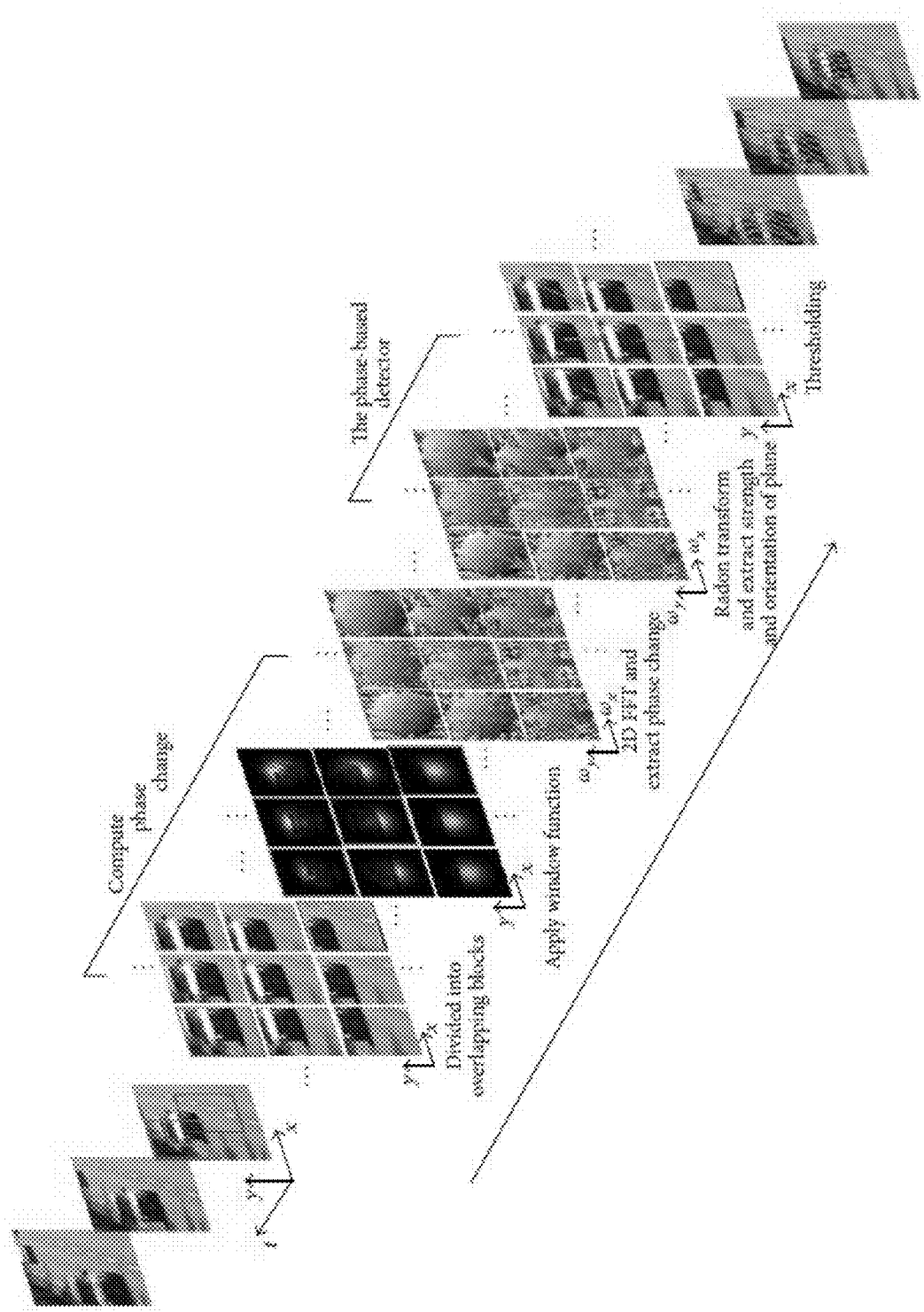
FIG. 6 is a schematic diagram that depicts the operation of a phase-based motion detection algorithm, according to embodiments.

FIG. 5 depicts an example phase-motion detection algorithm in accordance with one or more embodiments. The algorithm depicted can be implemented on a general purpose computer, such as a desktop, laptop, or notebook computer. Further, the algorithm can be implemented as a parallel algorithm, and is capable of exploiting parallel computing capabilities of high-speed servers. FIG. 6 depicts a schematic diagram of the operation of the phase-based motion detection algorithm. Each of the planes depicted in the figure corresponds to a step of the algorithm, and presents an in-progress view of a video frame on which the algorithm operates.

The algorithm shown in FIG. 5 can be subdivided into two parts. The first part computes local phase changes and the second part is the phase-based motion detector.

In the first part, a screen is divided into overlapping blocks. For example, the red, green, and blue blocks in the plane "divide into overlapping blocks" correspond to the squares of the same color covering the video stream. A Gaussian window is then applied on each block, followed by a 2D FFT operation that is used to extract the local phase. A temporal high-pass filter is then employed to extract phase changes.

In the second part of the algorithm, the PMI is evaluated for each block based on the Radon transform of the local phase changes in each block. Motion is detected for blocks with a PMI larger than a preset threshold, and the direction of motion is computed as in (39). The algorithm of FIG. 5 can be parallelized.

The algorithm depicted in FIG. 5 is based on the FFT. The algorithm can be modified by extending the FFT to higher dimensions. For example, this technique is applicable to 3D motion detection and segmentation.

According to one or more embodiments, an N-dimensional signal $u(x_1, \ldots, x_n, t)$ is received and the N-dimensional STFT is applied. Window functions defined as $$w_{k_1, \ldots, k_n}(x_1, \ldots, x_n) = ce^{-\frac{(x_1-x_{k_1})^2+\ldots+(x_n-x_{k_n})^2}{2\sigma^2}}$$

are constructed, where $x_{ki}=k_ib_0$, $k_i\in\mathbb{Z}$ and $b_0>0$. The scaling constant c guarantees that the windows approximately form a partition of unity. The N-dimensional FFT can then be applied on the windowed signal $u(x_1, \ldots, x_n)$ $w_{k_1,\ldots,kn}(x_1,\ldots,x_n)$. Motion in the higher N-dimensional space can then be extracted from local phase information.

Figure 7:
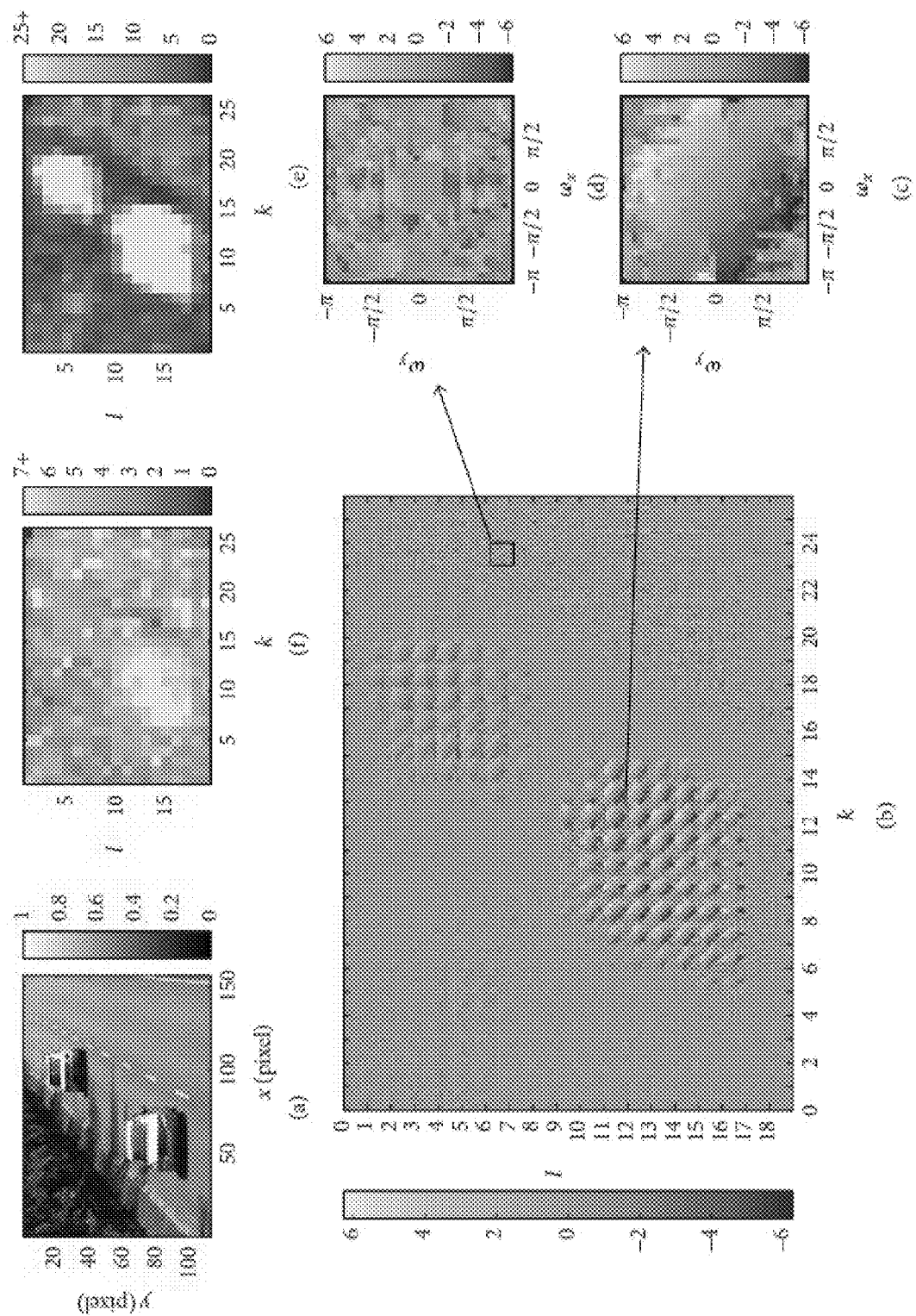
FIG. 7 is a schematic diagram that depicts how motion is detected using a phase-based motion algorithm, according to embodiments.

In FIG. 7, an illustrative example depicting how motion is detected using the algorithm of FIG. 5 is provided. FIG. 7(a) depicts a still from a "highway video" evaluated at a particular time $t_0$. In accordance with the algorithm, the screen in FIG. 7(a) is divided into 26×19 overlapping blocks and the window functions are applied to each block. Local phases can then be extracted from the 2D FFT of each windowed block, and the local phase changes are obtained by temporal high-pass filtering. The phase change is shown in FIG. 7(b) for all blocks, with block (12, 11) enlarged in FIG. 7(c) and block (23, 6) enlarged in FIG. 7(d). It should be noted that, at the time of the video frame, block (12, 11) covers a part of the vehicle in motion in the front, and block (23, 6) corresponds to an area of the highway pavement where no motion occurs.

FIG. 7(f) depicts, for each block (k,l), the maximum phase change over all $(w_x, w_y) \in \mathbb{D}^2$. That is, $$\max_{(\omega_x, \omega_y) \in \mathbb{D}^2} \left| \frac{d\phi_{kl}}{dt}(\omega_x, \omega_y, t_0) \right|. \tag{41}$$

As shown in the figure, for regions with low amplitude, such as the region depicting the road, when the normalization constant is absent, the derivative of the phase can be noisy. For these blocks the maximum of $|(d\varphi_{kl}/dt)(w_x,w_y,t_0)|$ over all $(w_x,w_y) \in \mathbb{D}^2$ is comparable to the maximum obtained for blocks that cover the vehicles in motion.

However, (29) illustrates that the local phase change from multiple filter pairs centered at the same spatial position (k,l) can provide a constraint to robustly estimate motion and its direction. Given the block structure employed in the computation of the local phase, phase change information from multiple sources is utilized.

Indeed, if, for a particular block (k,l), $(d\theta_{kl}/dt)(w_x,w_y,t)=-v_x(t)w_x-v_y(t)w_y$, then $(d\varphi_{kl}/dt)(w_x,w_y,t)$ will be zero on the line $v_x(t)w_x+v_y(t)w_y=0$ and have opposite sign on either side of this line. For example, in FIGS. 7(b) and 7(c), $(d\varphi_{kl}/dt)(w_x,w_y,t_0)$ exhibits this property for blocks that cover a vehicle in motion. The PMI is a tool to evaluate this property.

Finally, the PMIs for all blocks are shown compactly in a heat map in FIG. 6(e). The figure shows that the blocks corresponding to the two moving vehicles have a high PMI value while the stationary background areas have a low PMI value, enabling detection of motion by employing thresholding. This is also exhibited in the plane entitled "Radon transform and extract strength orientation of plane" in FIG. 6.

Relationship to Biological Motion Detectors. One way to implement local motion detectors is to apply a complex-valued Gabor receptive field (5) to the video signal u, and then take the derivative of the phase with respect to time or apply a high-pass filter on the phase to approximate the derivative.

An alternate implementation without explicitly computing the phase is provided herein. This implementation elucidates the relation between the phase-based motion detector disclosed earlier and some elementary motion detection models used in biology, such as the Reichardt motion detector and motion energy detector.

Assuming that the local phase $\varphi_{00}(w_x,w_y,t)$ is differentiable, then $$\frac{d\phi_{00}(\omega_x, \omega_y, t)}{dt} = \frac{(db(\omega_x, \omega_y, t)/dt)a(\omega_x, \omega_y, t) - (da(\omega_x, \omega_y, t)/dt)b(\omega_x, \omega_y, t)}{[a(\omega_x, \omega_y, t)]^2 + [(\omega_x, \omega_y, t)]^2}, \tag{42}$$

where $a(w_x,w_y,t)$ and $b(w_x,w_y,t)$ are, respectively, the real and imaginary parts of $A_{00}(w_x,w_y,t)e^{j\varphi^{00}(wx,wy,t)}$.

The denominator of (42) is the square of the local amplitude of u, and the numerator is of the form of a second order Volterra kernel. Thus, the time derivative of the local phase can be viewed as a second order Volterra kernel that processes two normalized spatially filtered inputs $V_1$ and $V_2$.

Figure 8:
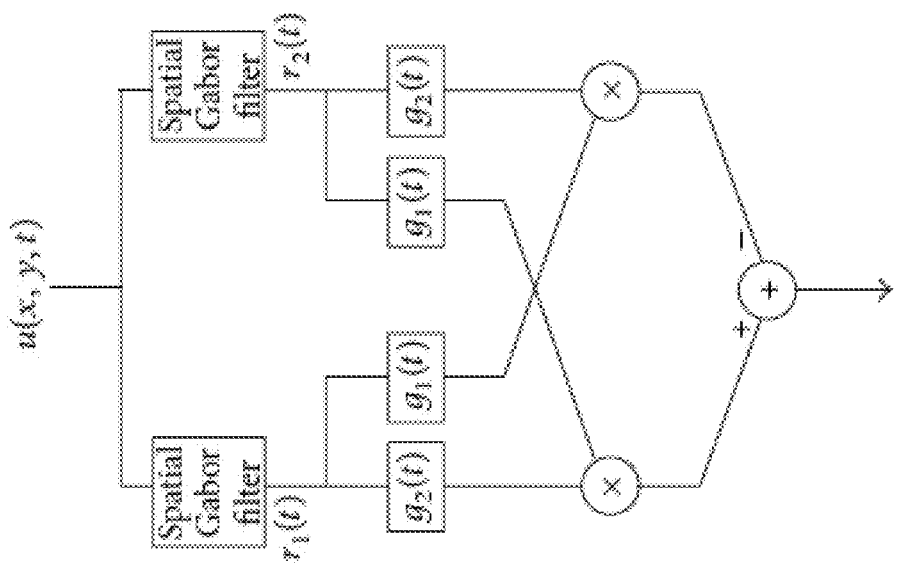
FIG. 8 is a block diagram of an elaborated Reichardt motion detector.

An well-known Reichardt motion detector is shown in FIG. 8. It is equipped with a quadrature pair of Gabor filters whose outputs are $r_1(t)=a(w_x,w_y,t)$ and $r_2(t)=b(w_x,w_y,t)$, respectively, for a particular value of $(w_x,w_y)$. The pair of Gabor filters that provide these outputs are the real and imaginary parts of $w(x,y)e^{-j(wx\,x+wy\,y)}$. It also includes a temporal high-pass filter $g_1(t)$ and temporal low-pass filter $g_2(t)$. The output of the elaborated Reichardt detector follows the diagram in FIG. 8 and can be expressed as $$(r_2 * g_1)(t)(r_1 * g_2)(t) - (r_1 * g_1)(t)(r_2 * g_2)(t). \tag{43}$$

The response can also be characterized by a second order Volterra kernel. It should be noted that there is a similarity between (43) and the numerator of (42). In fact, the phase-based motion detector shares some properties with the Reichardt motion detector. For example, a single phase-based motion detector is tuned to the temporal frequency of a moving sinusoidal grating.

Since the motion energy detector is formally equivalent to an elaborated Reichardt motion detector, the structure of the motion energy detector with divisive normalization is also similar to the phase-based motion detector.

The phase-based motion detection algorithm can be applied to video sequences to detect local motion. Further, the detected local motion can be used in motion segmentation tasks. In one embodiment, the algorithm can be implemented in PyCUDA and executed on an NVIDIA GeForce GTX TITAN GPU. In some embodiments, computations use single precision floating points. The phase-based motion detection algorithm can also be implemented in real-time using parallel computing devices. In some embodiments, the algorithm can be implemented on a fast GPU based on the FFT and Matrix-Matrix multiplication. Such operations can be implemented in hardware, for example, in FPGAs.

In certain embodiments, the disclosed motion detection algorithm can be applied to video sequences that do not exhibit camera egomotion. For these video sequences, the standard deviation of the Gaussian window functions can be set to 4 pixels and the block size can be set to 32×32 pixels.

Examples of Phase-Based Motion Detection

Figure 9:
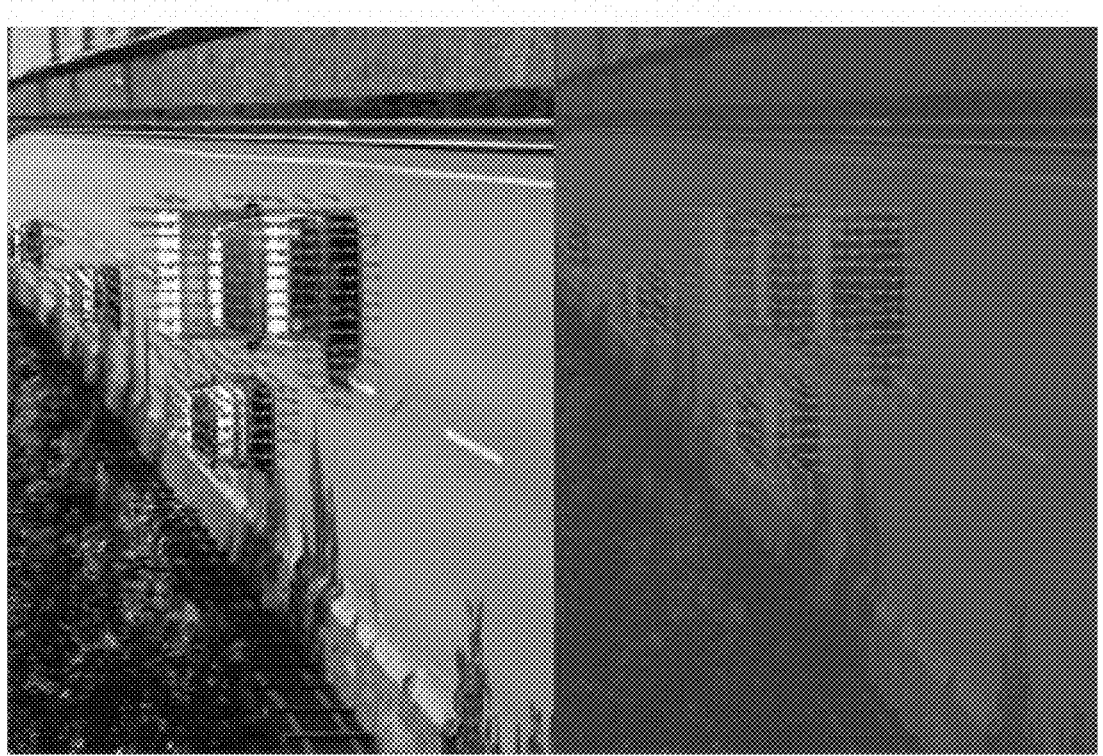
FIG. 9 depicts motion detection in a first video using an embodiment of a phase-based motion detection algorithm.

A first video, illustrated in FIG. 9, is a viewpoint from a highway surveillance camera ("highway video") under good illumination conditions and high contrast. The video has moderate noise, particularly on the road surface. The detected motion is shown in the top left panel of FIG. 9. The phase-based motion detection algorithm captures both the moving cars and the tree leaves moving (due to the wind). As shown, in the time interval between the 9th and 10th second, the camera was slightly moved left and rightwards within 5 frames, again possibly due to the wind. However, movement due to this shift is captured by the motion detection algorithm and the algorithm determines the direction of this movement. In this video, we already noted that this algorithm suffers from the aperture problem. For example, in front of the van where a long, horizontal edge is present, the detected motion is mostly pointing downwards. In addition to moving downwards, the edge is also moving to the left, however. This is expected since the algorithm only detects motion locally and does not take into account the overall shape of any object.

The range of the screen intensity is squeezed from [0, 1] to [0.2, 0.4], resulting in a video with a lower mean luminance and lower contrast. The motion detection results on the low-contrast video are shown in the bottom panels of FIG. 9. FIG. 9 shows that while the motion detection performance is degraded, the phase-based motion detector detects most of the moving vehicles.

Figure 10:
FIG. 10 depicts motion detection in a second video using an embodiment of a phase-based motion detection algorithm.

A second video depicts the viewpoint of a surveillance camera in a train station ("train station video"). The video exhibits moderate room light with a low noise level. The front side of the video has high contrast; illumination on the back side is low. The detected motion is shown in the video of FIG. 10. As shown, movements of people are successfully captured by the motion detection algorithm.

Figure 11:
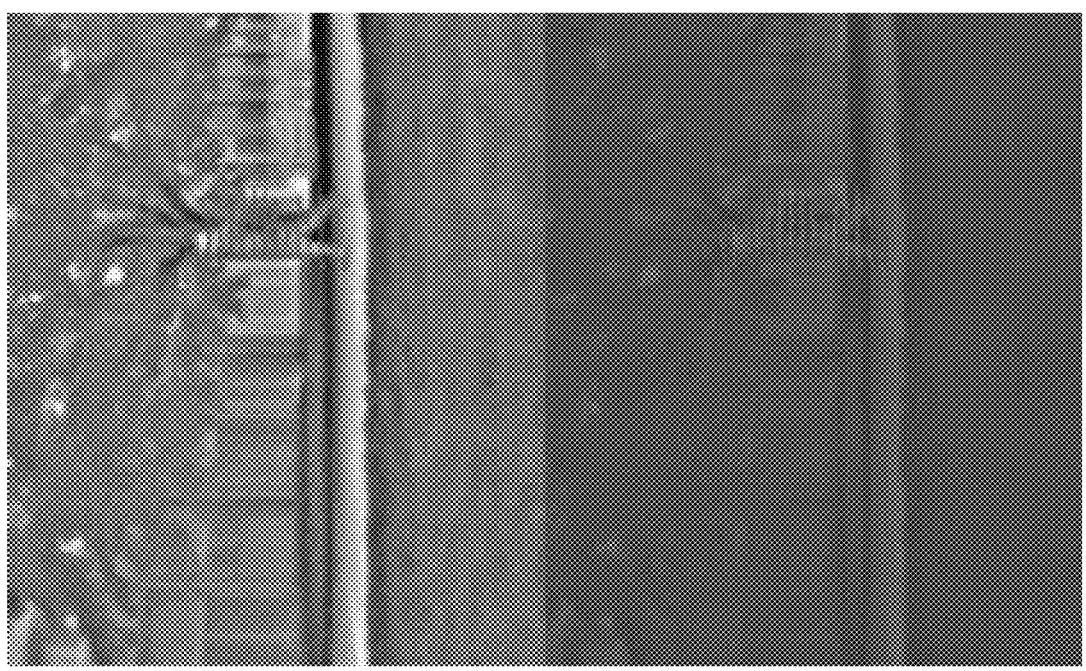
FIG. 11 depicts motion detection in a third video using an embodiment of a phase-based motion detection algorithm.

A third video is a "thermal video" with a large amount of background noise ("thermal video"). In this example, the threshold for detecting motion is raised by approximately 60% in order to mitigate the increased level of noise. The detected motion is shown in the video of FIG. 11.

Figure 12:
FIG. 12 depicts motion detection in a fourth video using an embodiment of a phase-based motion detection algorithm.

A fourth video depicts the viewpoint of a highway surveillance camera at night ("winterstreet video"). As shown, the overall illumination on the lower-left side is low whereas illumination is moderate on the upper-right side where the road is covered by snow. The detected motions are shown in the video in FIG. 12. It should be noted that car movements are successfully detected. Car movements on the lower-left side, however, suffer from low illumination and some parts of the car are not detected well due to the trade-off employed for noise suppression.

Figure 14:
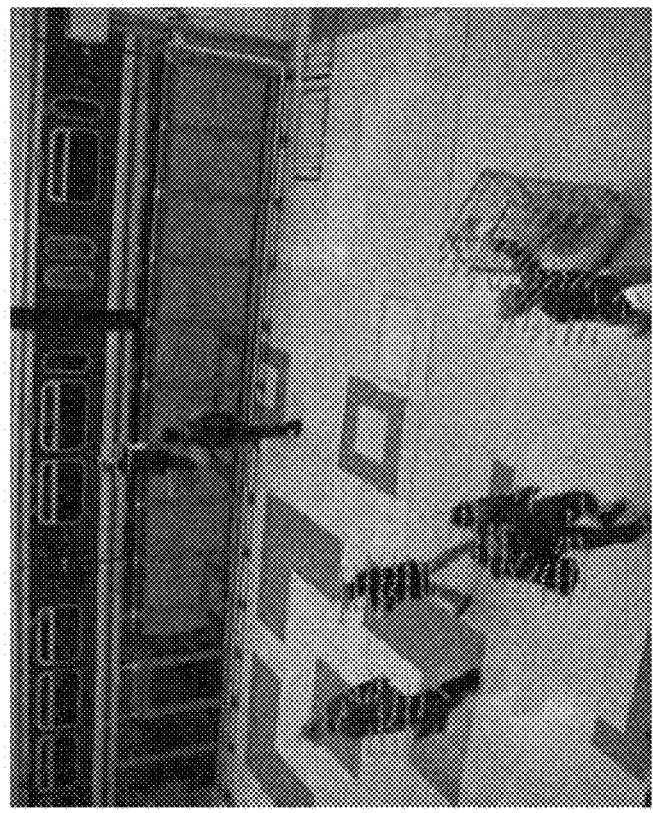
FIGS. 13 and 14 depict motion detection in two different videos in the presence of Gaussian noise using an embodiment of a phase-based motion detection algorithm.
Figure 13:
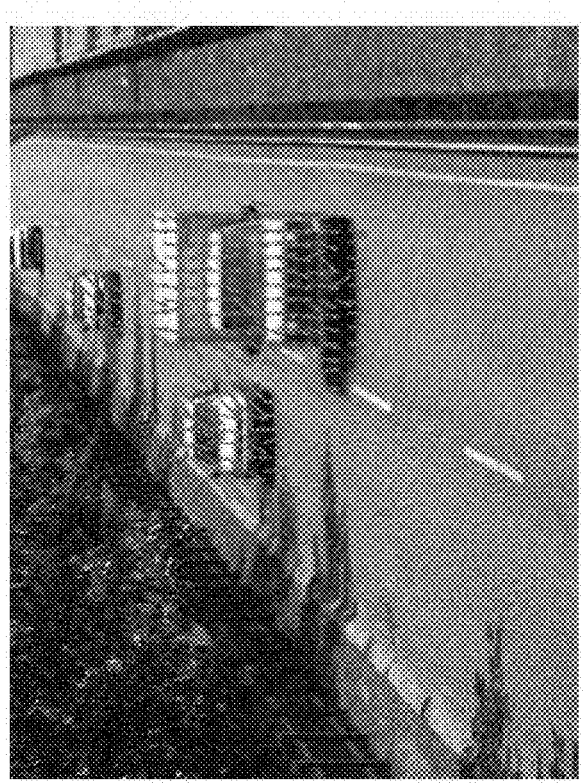

With a higher threshold, embodiments of the phase-base motion detection algorithm are able to detect motion under noisy conditions. This is depicted in FIGS. 13 and 14, in which Gaussian white noise with a standard deviation of 5% of the maximum luminance range has been added to the original "highway video" and "train station video."

Motion Segmentation. The detected motion signals in the depicted video sequences can be useful for segmenting moving objects from the background. To this end, a larger threshold is applied to only signal motion for salient objects. The 32×32 blocks, however, introduce large boundaries around the moving objects. To reduce the boundary and to segment the moving object more closely to the actual object boundary, the motion detection algorithm can be applied around the detected boundary with 16×16 blocks. If 16×16 blocks do not indicate motion, then the corresponding area can be removed from the segmented object area.

Figure 15:
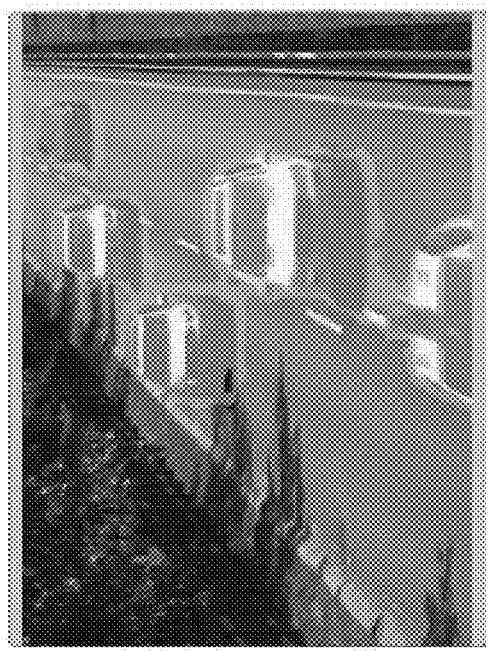

FIG. 15 depicts a result of applying embodiments of the motion based segmentation on a 2-second segment of the "highway video." With a higher threshold, the movement of the leaves is no longer picked up by the phase-based motion detector. Therefore, only the cars were identified as moving objects. Although the moving objects are not perfectly segmented on their boundary, they are mostly captured.

Figure 16:
FIGS. 15-18 depict segmentation of moving objects based on motion detected using an embodiment of a phase-based motion detection algorithm.
Figure 18:
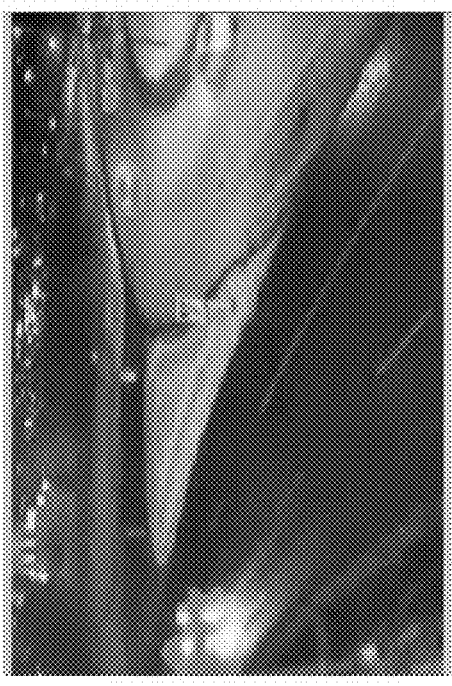
Figure 17:
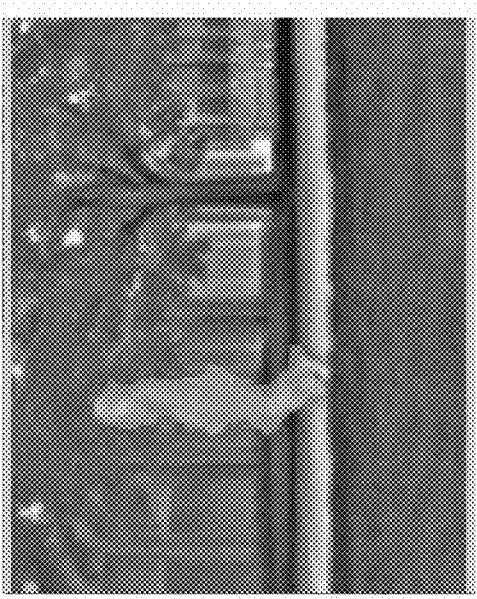

FIGS. 16-18 depict the results of applying the motion segmentation to a 2-second segment of the "train station video," the "thermal video," and the "winterstreet video," respectively. As shown in FIG. 16, the segmentation results in the detection of people moving in the scene, as opposed to non-salient objects that can be detected. FIG. 17 also illustrates the segmentation of moving people, as opposed to non-salient objects, in the "thermal video" scene. Finally, FIG. 18 depicts the segmentation of moving cars in the "winterstreet video" scene, as opposed to non-salient objects that otherwise can be detected (such as smaller objects that are disturbed by wind movement). These results show that for the purpose of detecting local motion and its use as a motion segmentation cue, the local phase-based motion detector works as well as, if not better than, a simple thresholding segmentation using an optic flow based algorithm.

Although one or more embodiments have been described herein in some detail for clarity of understanding, it should be recognized that certain changes and modifications can be made without departing from the spirit of the disclosure. The embodiments described herein can employ various computer-implemented operations involving data stored in computer systems. For example, these operations can require physical manipulation of physical quantities—usually, though not necessarily, these quantities can take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure can be useful machine operations. In addition, one or more embodiments of the disclosure also relate to a device or an apparatus for performing these operations. The apparatus can be specially constructed for specific required purposes, or it can be a general purpose computer selectively activated or configured by a computer program stored in the computer. In particular, various general purpose machines can be used with computer programs written in accordance with the teachings herein, or it can be more convenient to construct a more specialized apparatus to perform the required operations.

The embodiments described herein can be practiced with other computer system configurations including hand-held devices, microprocessor systems, microprocessor-based or programmable consumer electronics, minicomputers, mainframe computers, and the like.

One or more embodiments of the present disclosure can be implemented as one or more computer programs or as one or more computer program modules embodied in one or more computer readable media. The term computer readable medium refers to any data storage device that can store data which can thereafter be input to a computer system—computer readable media can be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications can be made within the scope of the claims. Accordingly, the described embodiments are to be considered as illustrative and not restrictive, and the scope of the claims is not to be limited to details given herein, but can be modified within the scope and equivalents of the claims. In the claims, elements do not imply any particular order of operation, unless explicitly stated in the claims.

Many variations, modifications, additions, and improvements can be made. Plural instances can be provided for components, operations or structures described herein as a single instance. Boundaries between various components, operations and data stores are somewhat arbitrary, and particular operations are illustrated in the context of specific illustrative configurations. Other allocations of functionality are envisioned and can fall within the scope of the disclosure(s). In general, structures and functionality presented as separate components in exemplary configurations can be implemented as a combined structure or component. Similarly, structures and functionality presented as a single component can be implemented as separate components. These and other variations, modifications, additions, and improvements can fall within the scope of the appended claim(s).

What is claimed is:

1. A computer-implemented method for motion detection, the computer comprising a processor, memory, input device, and output device, the method comprising:
   receiving data representing a time sequence of frames of an n-dimensional signal, where n is an integer greater than or equal to 2;
   constructing an n-dimensional Gaussian window;
   dividing each frame of the received data into a plurality of blocks, each block having a plurality of pixels; and
   for each block in the plurality of blocks:
      multiplying each pixel in the block with a corresponding pixel of the Gaussian window to obtain a windowed signal block;
      computing the FFT of the windowed signal block to obtain an amplitude and phase thereof;
      applying a high-pass filter to the phase of the FFT of the windowed signal block to obtain local phase changes thereof;
      computing a radon transform of the local phase changes of the windowed signal block; and
      detecting the occurrence of motion in the block based on the computed phase of the windowed signal block,
      wherein said detecting motion comprises:
         computing a phase motion indicator based on the computed radon transform;
         determining whether the phase motion indicator exceeds a predetermined threshold; and
         if the phase motion indicator exceeds the predetermined threshold, then determining that motion has occurred in the block.

2. The method of claim 1, further comprising computing a direction of the detected motion based on the computed radon transform.

3. The method of claim 1, wherein two or more blocks in the plurality of blocks overlap with each other.

4. The method of claim 1, wherein the signal is a 2-dimensional video stream.

5. A system, comprising:
   a processor; and
   a memory, wherein the processor is programmed to carry out a method of motion detection, the method comprising:
      receiving data representing a time sequence of frames of an n-dimensional signal, where n is an integer greater than or equal to 2;
      constructing an n-dimensional Gaussian window;
      dividing each frame of the received data into a plurality of blocks, each block having a plurality of pixels; and
      for each block in the plurality of blocks:
         multiplying each pixel in the block with a corresponding pixel of the Gaussian window to obtain a windowed signal block;
         computing the FFT of the windowed signal block to obtain an amplitude and phase thereof;
         applying a high-pass filter to the phase of the FFT of the windowed signal block to obtain local phase changes thereof;
         computing a radon transform of the local phase changes of the windowed signal block; and
         detecting the occurrence of motion in the block based on the computed phase of the windowed signal block,
         wherein said detecting motion comprises:
            computing a phase motion indicator based on the computed radon transform;
            determining whether the phase motion indicator exceeds a predetermined threshold; and
            if the phase motion indicator exceeds the predetermined threshold, then determining that motion has occurred in the block.

6. The system of claim 5, wherein the method further comprises computing a direction of the detected motion based on the computed radon transform.

7. The system of claim 5, wherein two or more blocks in the plurality of blocks overlap with each other.

8. The system of claim 5, wherein the signal is a 2-dimensional video stream.

9. A non-transitory computer readable medium that stores instruction that, when executed by a processor, cause the processor to carry out a method of motion detection, the method comprising:
   receiving data representing a time sequence of frames of an n-dimensional signal, where n is an integer greater than or equal to 2;
   constructing an n-dimensional Gaussian window;
   dividing each frame of the received data into a plurality of blocks, each block having a plurality of pixels; and
   for each block in the plurality of blocks:
      multiplying each pixel in the block with a corresponding pixel of the Gaussian window to obtain a windowed signal block;
      computing the FFT of the windowed signal block to obtain an amplitude and phase thereof;
      applying a high-pass filter to the phase of the FFT of the windowed signal block to obtain local phase changes thereof;
      computing a radon transform of the local phase changes of the windowed signal block; and
      detecting the occurrence of motion in the block based on the computed phase of the windowed signal block,
      wherein said detecting motion comprises:
         computing a phase motion indicator based on the computed radon transform;
         determining whether the phase motion indicator exceeds a predetermined threshold; and
         if the phase motion indicator exceeds the predetermined threshold, then determining that motion has occurred in the block.

10. The non-transitory computer readable medium of claim 9, wherein the method further comprises computing a direction of the detected motion based on the computed radon transform.

11. The non-transitory computer readable medium of claim 9, wherein the signal is a 2-dimensional video stream.

* * * * *